(12) United States Patent
Knoblauch et al.

(10) Patent No.: US 8,403,088 B2
(45) Date of Patent: Mar. 26, 2013

(54) ELECTRIC AXLE DRIVE UNIT

(75) Inventors: Daniel Knoblauch, Untergruppenbach (DE); Alexander Kreim, Bretzfeld-Waldach (DE); Ulrich Knoedel, Ingersheim (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 270 days.

(21) Appl. No.: 12/403,300

(22) Filed: Mar. 12, 2009

(65) Prior Publication Data

US 2009/0211824 A1 Aug. 27, 2009

Related U.S. Application Data

(63) Continuation of application No. PCT/EP2007/007732, filed on Sep. 5, 2007.

(30) Foreign Application Priority Data

Sep. 22, 2006 (DE) .......................... 10 2006 046 419

(51) Int. Cl.
   *B60K 1/00* (2006.01)
   *F16H 37/00* (2006.01)
(52) U.S. Cl. ...................... 180/65.7; 475/207
(58) Field of Classification Search ................ 180/65.1, 180/65.6, 65.7, 65.245, 242; 475/198, 207, 475/218
See application file for complete search history.

(56) References Cited

U.S. PATENT DOCUMENTS

| | | | | |
|---|---|---|---|---|
| 2,027,218 | A * | 1/1936 | Armington | 74/664 |
| 4,418,777 | A * | 12/1983 | Stockton | 180/65.6 |
| 4,572,343 | A * | 2/1986 | Boffelli | 192/56.41 |
| 4,660,669 | A * | 4/1987 | Shimizu | 180/444 |
| 5,419,406 | A * | 5/1995 | Kawamoto et al. | 180/65.6 |
| 5,443,130 | A * | 8/1995 | Tanaka et al. | 180/65.6 |
| 5,620,387 | A | 4/1997 | Janiszewski | |
| 5,696,680 | A * | 12/1997 | Ichioka et al. | 701/67 |
| 2003/0203782 | A1 * | 10/2003 | Casey et al. | 475/150 |
| 2007/0023211 | A1 * | 2/2007 | Keller et al. | 180/65.2 |

FOREIGN PATENT DOCUMENTS

| | | |
|---|---|---|
| DE | 195 24 524 A1 | 1/1997 |
| DE | 198 41 159 A1 | 1/2000 |
| DE | 103 15 210 A1 | 11/2003 |
| WO | WO 2007/018958 A | 2/2007 |

OTHER PUBLICATIONS

International Application No. PCT/EP2007/007732; PCT International Preliminary Report on Patentability; Apr. 7, 2009.

* cited by examiner

*Primary Examiner* — Frank Vanaman
(74) *Attorney, Agent, or Firm* — Knobbe, Martens, Olsen & Bear, LLP

(57) ABSTRACT

An electric axle drive unit for an axle of a vehicle has an electric machine. The drive output of electric machine can be connected to the input of a transmission device. The electric drive unit has a differential gear, the input member of which is connected to an output of the transmission device. The output members of the differential gear can be connected respectively to a left-hand and a right-hand driveshaft of the axle. At least one transmission stage of the transmission device and the differential gear are arranged on opposite sides of the electric machine in the axial direction. The differential gear is connected to the transmission stage by means of a hollow shaft.

36 Claims, 2 Drawing Sheets

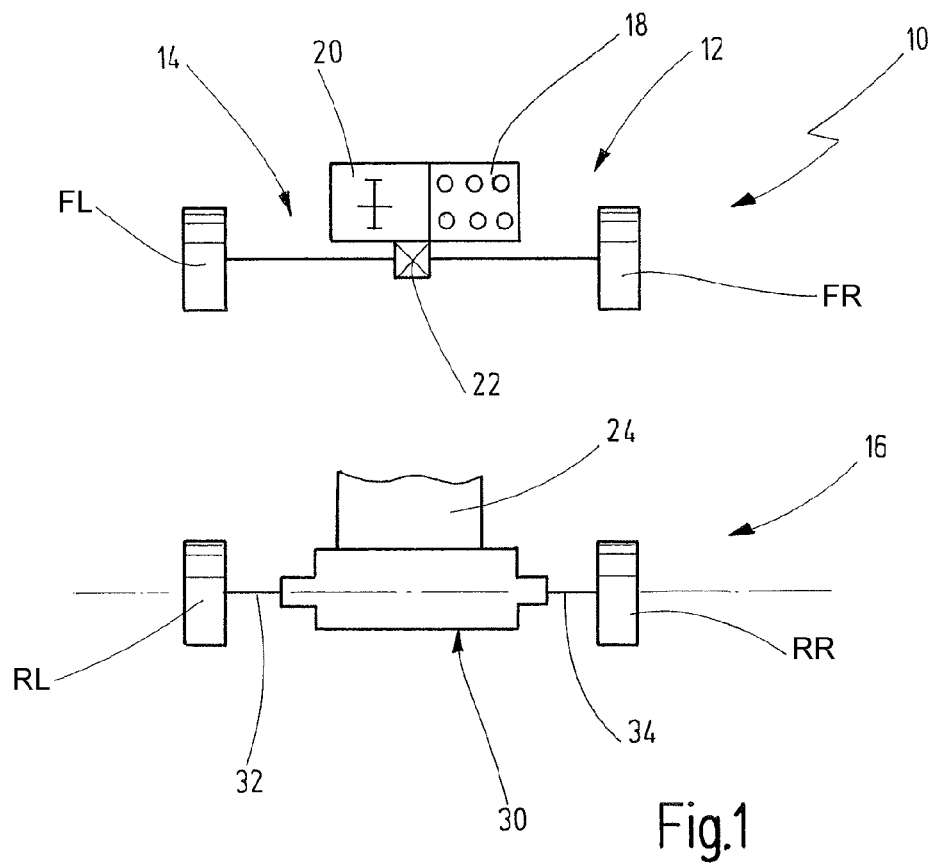
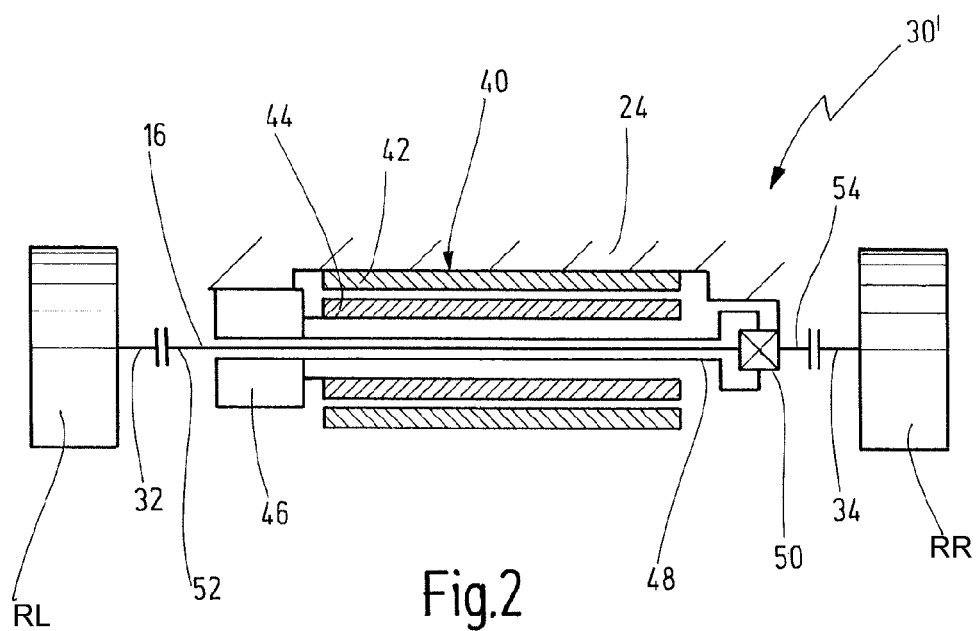

ELECTRIC AXLE DRIVE UNIT

CROSS REFERENCE TO RELATED APPLICATIONS

This is a Continuation application of International patent application PCT/EP 2007/007732, filed Sep. 5, 2007, which claims the priority of German patent application DE 10 2006 046 419, filed Sep. 22, 2006.

BACKGROUND OF THE INVENTION

The present invention relates to an electric axle drive unit for an axle of a vehicle, having an electric machine, the drive output of which can be connected to the input of a transmission device, and having a differential gear, the input member of which is connected to an output of the transmission device and the output members of which can be connected respectively to a left-hand and a right-hand driveshaft of the axle.

An electric axle drive unit of said type is suitable for driving an axle of a vehicle. It is generally conceivable for an electric axle drive unit of said type to constitute the only drive for the vehicle. Particularly preferable, however, is an application in which one axle of the vehicle is driven conventionally, for example by means of an internal combustion engine or a hybrid drive. The other axle of the vehicle is driven by the generic electric axle drive unit.

BRIEF SUMMARY OF THE INVENTION

It is the object of the invention to specify an improved electric axle drive unit of said type.

Said object is achieved by means of an electric axle drive unit for an axle of a vehicle, having an electric machine, the drive output of which can be connected to the input of a transmission device, and having a differential gear, the input member of which is connected to an output of the transmission device and the output members of which can be connected respectively to a left-hand and a right-hand driveshaft of the axle, wherein at least one transmission stage of the transmission device and the differential gear are arranged on opposite sides of the electric machine in the axial direction, and with the differential gear being connected to the transmission stage by means of a hollow shaft.

An electric axle drive unit of said type permits good utilization of the installation space which is generally available, with said installation space generally being larger in the middle and generally becoming smaller towards the side (towards the wheels). As a result of the transmission stage being arranged on one side of the electric machine and the differential gear being arranged on the other side of the electric machine, it is possible for the electric machine to be arranged centrally. On account of the available installation space, it is possible to use a relatively large electric machine.

The object is therefore achieved in its entirety.

It is particularly advantageous if the electric machine is arranged coaxially with respect to the axle, with the hollow shaft running through a rotor of the electric machine.

In this way, the installation space can be utilized in an optimum manner.

According to a further aspect of the present invention, the transmission device has at least two transmission stages.

In this way, the axle drive unit can be realized with a relatively high spread, such that the axle drive unit can be used optimally in a large number of driving situations.

Here, it is particularly advantageous if a first transmission stage is a spur gear stage arrangement with a countershaft which is arranged parallel to the axle.

Although a spur gear stage arrangement requires a certain amount of installation space in the radial direction on account of the countershaft, a spur gear stage arrangement of said type is a comparatively simple design option for shifting the transmission stages. The spur gear stage arrangement preferably comprises two spur gear stages.

It is particularly preferable here if the first transmission stage (spur gear stage arrangement) is arranged on that side of the electric machine which is situated opposite the differential gear in the axial direction.

In this way, it is possible for the spur gear stage arrangement and the differential gear to be accommodated in an optimum manner in terms of installation space.

As mentioned above, it is particularly advantageous if the transmission stages can be selected by means of a shift device.

In this way, it is possible to realize a high spread.

Here, it is particularly preferable if the shift device is arranged on that side of the electric machine which is situated opposite the differential gear.

This also leads to optimum installation space utilization.

According to a further preferred embodiment, a second transmission stage is arranged on the same side as the differential gear in the axial direction.

Optimized installation space utilization is thus again provided in particular when the shift device is arranged on the other side.

According to a further embodiment, the shift device is designed to alternatively connect one of the transmission stages, or at least two of the transmission stages in series, into the power flow.

In said embodiment, the drive power of the electric machine is, in the one shift position, transmitted via one of the transmission stages. It is therefore possible to already obtain a considerable rotational speed reduction in said one operating mode, such that it is possible to use an electric machine which runs at high rotational speeds. In the other shift position, at least two of the transmission stages (preferably the one transmission stage and a second transmission stage) are connected into the power flow in series. In this way, the transmission ratios are multiplied with one another, which contributes to a high spread.

It is also particularly advantageous if a first transmission stage is a spur gear stage arrangement with a countershaft which is arranged parallel to the axle, with the shift device being assigned to the spur gear stage arrangement.

Since a spur gear stage arrangement can generally be shifted more easily on account of the countershaft provided (as in a manual shift transmission), it is preferably if the shift device is assigned to said transmission stage.

According to a further preferred embodiment, the shift device is an electromagnetic shift device.

This makes it possible to realize the electric axle drive unit without hydraulic or other complex shift actuators. In particular, a complex cabling arrangement is dispensed with. This also applies to any electric shift actuators, such as for example shift rollers. There, however, the installation space requirement is generally slightly greater.

It is also particularly preferable if the shift device has a neutral position in which the transmission device is decoupled from the electric machine.

This provides a safety measure in the event of a failure of the power electronics. Furthermore, it is possible for the drive unit to be decoupled from the drive output. In relation to the drive wheels, it is thereby possible for the mass moments of inertia to be reduced, which can have a positive effect inter alia during braking processes with ABS regulation or driving states with ESP regulation.

According to an alternative embodiment, the transmission device has only a single transmission stage.

In said embodiment, it is possible to realize the axle drive unit with few components. The power of the electric machine is always transmitted via the single transmission stage to the differential gear.

It is also preferable overall if the electric machine, the transmission device and the differential gear are fixed to a common support (for example a common housing arrangement) which can be fixed to a vehicle body.

In this way, it is possible for the electric axle drive unit to be provided as a pre-assembled unit.

It is also advantageous if the differential gear has a planet-gear differential.

It is possible for axial installation space to be saved in this way.

In general, electric axle drive units according to the invention permit the following mode of operation. In the preferred application as a drive for a second axle of a vehicle whose first axle is driven conventionally, it is possible to realize various operating modes. For example, the vehicle may be driven solely by means of the electric axle drive unit (for example during parking processes or when starting). On the other hand, the drive power of the conventional engine on the one axle may be added to the drive power of the axle drive unit according to the invention "through the road". Recuperation is also possible.

A vehicle having an axle drive unit which is implemented in this way does not require a cardan shaft. The result is only a low level of cabling expenditure, since the required power electronics and the energy store can likewise be arranged in the region of the axle to which the electric axle drive unit is assigned.

Furthermore, an axle drive unit of said type does not increase the unsprung mass (the mass which is suspended by the tyres) (as is the case for example with wheel-hub motors), and therefore does not adversely affect the driving behaviour.

In relation to entirely peripheral drives (for example wheel-hub motors), there is a reduced level of cabling expenditure, and therefore fewer EMC problems.

Furthermore, (water) cooling can be realized in a considerably simpler manner than in peripheral drives of said type.

The differential gear which is used may be a mechanical differential gear which distributes the drive power to the driveshafts in a conventional manner per se, though may also have two separately controllable clutches (friction clutches). In the latter case, it is possible to realize "active yaw" control.

It is self-evident that the features specified above and the features yet to be explained below can be used not only in the respectively specified combination but rather also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing:

FIG. 1 shows a schematic plan view of a motor vehicle having an electric axle drive device according to the invention;

FIG. 2 shows a schematic section illustration of an electric axle drive unit according to a further embodiment of the present invention.

DETAILED DESCRIPTION OF THE INVENTION

Figure 3:
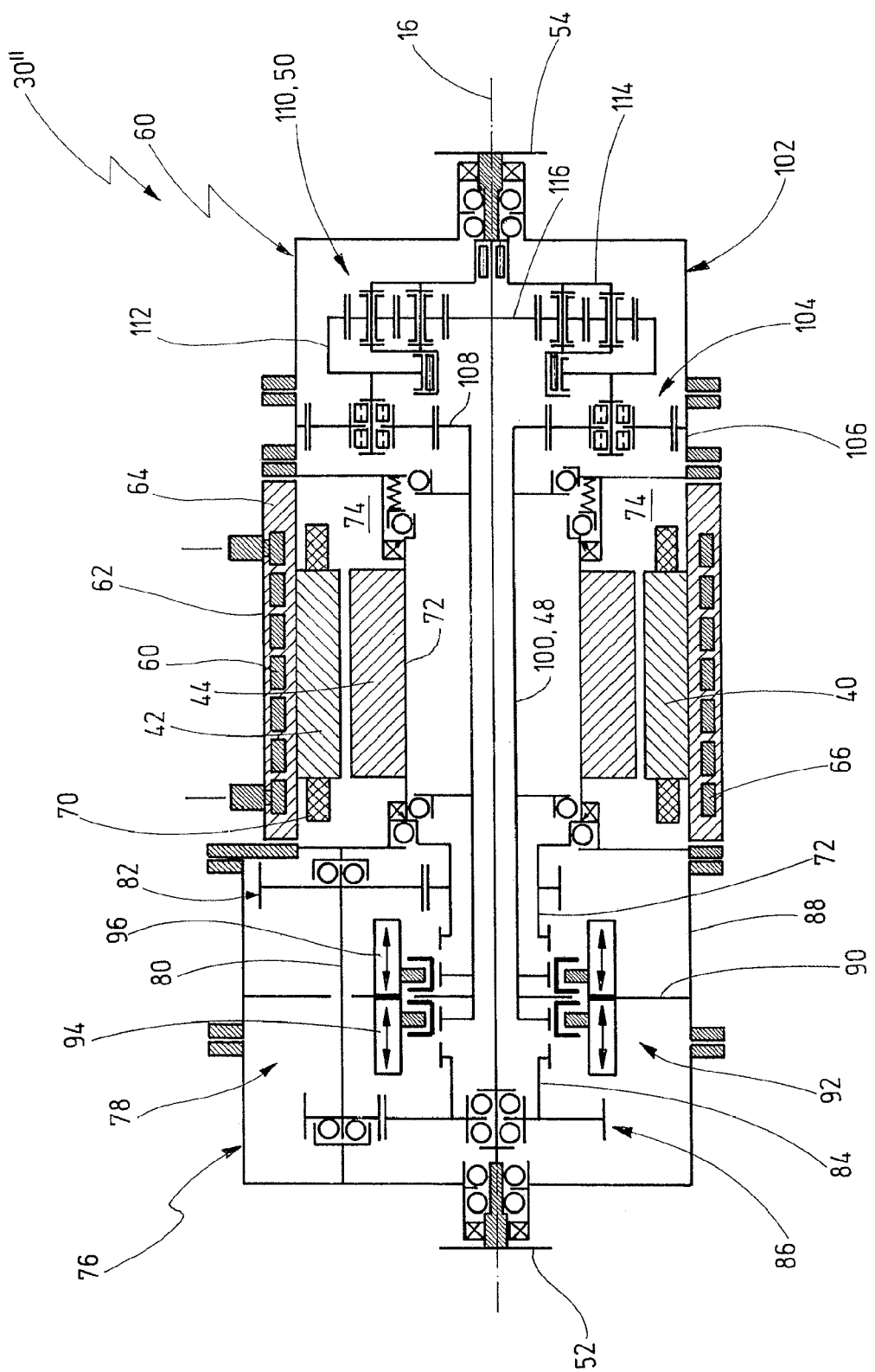
FIG. 3 shows a further schematic section view of an electric axle drive unit according to the invention.

In FIG. 1, a vehicle (such as a passenger motor vehicle) is denoted generally by 10.

The vehicle 10 has a drivetrain 12 which has a first driven axle 14 (in the present case a front axle with front wheels FL, FR) and a second driven axle 16 (in the present case a rear axle with a left rear wheel RL and a right rear wheel RR).

An internal combustion engine 18 is provided in the region of the first driven axle 14, the output power of which internal combustion engine 18 is imparted to a transmission, such as a manual shift transmission, an automatic shift transmission, a dual-clutch transmission, a torque converter automatic transmission, etc. The output of the transmission 20 is connected to a differential 22 which distributes the drive power of the internal combustion engine 18 between the front wheels FL, FR.

It is self-evident that an electric motor may also be incorporated in the drive unit 18, 20 in order to provide a hybrid system.

A chassis or underbody of the motor vehicle 10 is denoted schematically by 24 in FIG. 1. It can be seen that no cardan shaft extends between the axles 14, 16.

The second driven axle 16 is driven by an axle drive unit 30 which comprises an electric machine. The drive power of the electric machine is transmitted by means of the axle drive unit 30 to a left-hand driveshaft 32 and a right-hand driveshaft 34 which are connected to the rear wheels RL and RR respectively.

In FIG. 2, a first embodiment of an electric axle drive unit according to the invention is denoted generally by 30'.

The axle drive unit 30' has an electric machine 40 with a stator 42 and a rotor 44. The electric machine 40 is arranged coaxially with respect to the second driven axle 16. The stator 42 is fixed to the chassis 24.

The axle drive unit 30' also has a transmission device 46, whose input member is connected to the rotor 44. The transmission device 46 is arranged adjacent to the electric machine 40 in the lateral direction.

Arranged on the opposite side of the electric machine 40 is a differential gear 50, whose input member is connected by means of a hollow shaft 48 to the output of the transmission device 46. The hollow shaft 48 extends through the rotor 44 of the electric machine 40.

The differential gear 50 may be a conventional mechanical differential gear such as a bevel gear differential which distributes the drive power of the electric machine 40 between a left-hand output member 52 and a right-hand output member 54. The output members 52, 54 can be connected to the driveshafts 32, 34.

FIG. 3 shows a further preferred embodiment of an electric axle drive unit 30" according to the invention.

The axle drive unit 30" generally corresponds, in terms of design and mode of operation, to the axle drive units described above. Only differences are discussed below. Identical elements are provided with the same reference numerals.

The axle drive unit 30" has a housing arrangement 60 to which the electric machine 40, the differential gear 50 and a transmission device are fixed and in which said electric machine 40, differential gear 50 and transmission device are accommodated, which housing arrangement 60 will be explained in more detail below.

The housing arrangement 60 has an approximately cylindrical motor housing 62 which comprises a cooling jacket 64, with cooling ducts 66 for fluid cooling (for example water cooling), and to which the stator 42 is fixed. The motor housing 62 surrounds the electric machine 40.

70 denotes a stator coil of the stator 42. A motor shaft which is connected to the rotor is denoted by 72. The motor housing 62 has a motor chamber 74 for holding the electric machine 40, which motor chamber 74 is sealed off with respect to the rest of the housing arrangement 60 by means of suitable seals (shaft seals).

The housing arrangement 60 also has a first housing cover 76 which is flange-mounted in the axial direction (laterally) on the motor housing 62 and which accommodates a first transmission stage 78 in the form of a spur gear stage of the transmission device 46.

The first transmission stage 78 comprises a spur gear stage arrangement with two spur gear stages and with a countershaft 80 which is arranged parallel to the axle 16. The first transmission stage 78 thus comprises a first gear set 82 in the form of a constant-ratio gear set which realizes a first transmission ratio (preferably of greater than 1, such as $\sqrt{2}$) between the rotor 44 and the countershaft 80. An output shaft 84 of the first transmission stage 78 is arranged coaxially with respect to the axle 16 and is connected by means of a second gear set 86 to the countershaft 80. The second gear set 86 provides a fixed, second transmission ratio (for example $\sqrt{2}$).

An intermediate housing 88 is arranged coaxially between the first housing cover 76 and the motor housing 62, which intermediate housing 88 may form a part of the housing cover 76. A bearing shield 90 is formed on the intermediate housing 88, to which bearing shield 90 is fixed a shift device 92. The shift device 92 may be an electromagnetic shift device, though may however also be a conventional synchronizing pack.

The shift device 92 comprises a first shift clutch 94 and a second shift clutch 96. The first shift clutch 94 has a neutral position (illustrated in FIG. 3) and a second position in which the output shaft 84 of the first transmission stage 78 is connected to a hollow shaft 100 (corresponding to hollow shaft 48) which runs through the rotor 44. The second shift clutch 96 has a neutral position (shown in FIG. 3) and a second position in which a motor shaft 72 of the rotor 44 is connected to the hollow shaft 100. It is self-evident that the two shift clutches 94, 96 are generally moved out of their respective neutral position only alternately.

On the side opposite the electric machine 40, a second housing cover 102 is flange-mounted laterally on the motor housing 62. The second housing cover 102 accommodates a second transmission stage 104 in the form of a planetary gear set and a differential gear 110 (corresponding to the differential gear 50) which is likewise designed as a planetary gear set.

Here, a ring gear 106 of the second transmission stage 104 is designed as a housing part which is fixed between the second housing cover 102 and the motor housing 62. A sun gear 108 of the second transmission stage 104 is connected to the hollow shaft 100. A planet carrier of the second transmission stage 104 is connected to an input member of the differential gear 110, more precisely to the ring gear 112 of the differential gear 110.

The planet carrier 114 of the differential gear 110 is connected to the right-hand output member 54. The sun gear 116 of the differential gear 110 is connected to the left-hand output member 52.

The transmission ratio of the first transmission stage is preferably in the range from 1.3 to 3, preferably in the range from 1.8 to 2.5.

The transmission ratio of the second transmission stage is preferably in the range from 3 to 8, preferably in the range from 5 to 7.

It is self-evident that the differential gear 110 may also be designed as a bevel-gear transmission.

It is also conceivable for the second transmission stage 104 to likewise be arranged on that side of the electric machine 40 which is opposite the differential gear 110.

It is generally also conceivable to dispense with a second transmission stage 104 entirely, that is to say to connect the hollow shaft 100 directly to an input member of the differential gear 110.

The second transmission stage 104 is preferably designed as a planetary gear set, since a high transmission ratio can be realized in this way and since the second transmission stage 104 is permanently in the power flow, that is to say need not be shifted (the shifting of planetary gear sets is generally more difficult to realize from a design aspect).

What is claimed is:

1. Electric axle drive unit for an axle of a vehicle, comprising an electric machine arranged in an axial direction, the drive output of which is connected to the input of a transmission device, and having a single differential gear that distributes drive power from the transmission to a left-hand and a right-hand driveshaft of the axle, wherein the differential gear is located entirely on one side of the electric machine, the input member of the differential gear is connected to an output of the transmission device and the output members of which are connected respectively to a left-hand and a right-hand driveshaft of the axle;

wherein at least one transmission stage of the transmission device and the differential gear are arranged on opposite sides of the electric machine in the axial direction, with the differential gear being connected to the transmission stage by a hollow shaft, wherein the transmission device has at least two transmission stages, and wherein the transmission stages can be selected by means of a shift device.

2. Electric axle drive unit according to claim 1, wherein the electric machine is arranged coaxially with respect to the axle, with the hollow shaft running through a rotor of the electric machine, wherein the hollow shaft is separate from a motor shaft that is the drive output of the rotor of the electric machine.

3. Electric axle drive unit according to claim 1, wherein a first transmission stage is a spur gear stage arrangement with a countershaft which is arranged parallel to the axle.

4. Electric axle drive unit according to claim 3, wherein the first transmission stage is arranged on that side of the electric machine which is situated opposite the differential gear in the axial direction.

5. Electric axle drive unit according to claim 1, wherein the shift device is arranged on that side of the electric machine which is situated opposite the differential gear.

6. Electric axle drive unit according to claim 1, wherein a second transmission stage is arranged on the same side as the differential gear in the axial direction.

7. Electric axle drive unit according to claim 6, wherein the second transmission stage comprises a planetary gear set.

8. Electric axle drive unit according to claim 7, wherein a ring gear of the planetary gear set is defined by a portion of a housing of the electric axle drive unit.

9. Electric axle drive unit according to claim 1, wherein the shift device is designed to alternatively connect one of the transmission stages, or at least two of the transmission stages in series, into the power flow.

10. Electric axle drive unit according to claim 1, wherein a first transmission stage is a spur gear stage arrangement with a countershaft which is arranged parallel to the axle, with the shift device being assigned to the spur gear stage.

11. Electric axle drive unit according to claim 1, wherein the shift device is an electromagnetic shift device.

12. Electric axle drive unit according to claim 1, wherein the shift device has a neutral position in which the transmission device is decoupled from the electric machine.

13. Electric axle drive unit according to claim 1, wherein the electric machine, the transmission device and the differential gear are fixed to a common support which can be fixed to a vehicle body.

14. Electric axle drive unit according to claim 1, wherein the differential gear has a planet-gear differential.

15. Electric axle drive unit according to claim 1, wherein the input member of the differential gear is driven only by the output of the transmission device and is not directly driven by a drive output of the electric machine.

16. Electric axle drive unit according to claim 1, wherein the drive output of the electric machine comprises a motor shaft that is driven by a rotor of the electric machine, wherein the hollow shaft is rotatable separately from, and is surrounded by, the motor shaft.

17. Electric axle drive unit for an axle of a vehicle, comprising an electric machine arranged in an axial direction, the drive output of which is connected to the input of a transmission device, and having a differential gear, the input member of which is connected to an output of the transmission device such that all drive power is provided to the differential gear by the transmission and not directly by the drive output of the electric machine, and the output members of the differential gear are connected respectively to a left-hand and a right-hand driveshaft of the axle, wherein the transmission device has at least two transmission stages, wherein the first transmission stage is arranged on that side of the electric machine which is situated opposite the differential gear in the axial direction, wherein a second transmission stage is arranged on the same side as the differential gear in the axial direction.

18. Electric axle drive unit according to claim 17, wherein a first transmission stage is a spur gear stage arrangement with a countershaft which is arranged parallel to the axle.

19. Electric axle drive unit according to claim 17, wherein the transmission stages can be selected by means of a shift device.

20. Electric axle drive unit according to claim 19, wherein the shift device is arranged on that side of the electric machine which is situated opposite the differential gear.

21. Electric axle drive unit according to claim 19, wherein the shift device is designed to alternatively connect one of the transmission stages, or at least two of the transmission stages in series, into the power flow.

22. Electric axle drive unit according to claim 19, wherein a first transmission stage is a spur gear stage arrangement with a countershaft which is arranged parallel to the axle, with the shift device being assigned to the spur gear stage.

23. Electric axle drive unit according to claim 19, wherein the shift device is an electromagnetic shift device.

24. Electric axle drive unit according to claim 19, wherein the shift device has a neutral position in which the transmission device is decoupled from the electric machine.

25. Electric axle drive unit according to claim 17, wherein the electric machine, the transmission device and the differential gear are fixed to a common support which can be fixed to a vehicle body.

26. Electric axle drive unit according to claim 17, wherein the differential gear has a planet-gear differential.

27. Electric axle drive unit according to claim 17, wherein the second transmission stage comprises a planetary gear set.

28. Electric axle drive unit according to claim 27, wherein a ring gear of the planetary gear set of the second transmission stage is defined by a portion of a housing of the electric axle drive unit.

29. Electric axle drive unit according to claim 17, wherein the drive output of the electric machine comprises a motor shaft that is driven by a rotor of the electric machine, wherein the first transmission stage and the second transmission stage are connected by a hollow shaft that is rotatable separately from, and is surrounded by, the motor shaft.

30. Electric axle drive unit for an axle of a motor vehicle, comprising:
   an electric machine arranged in an axial direction, the electrical machine having a stator and a rotor, the rotor being connected to a drive output of the electrical machine;
   a transmission device having a transmission input and a transmission output and at least one transmission stage;
   a differential gear having a differential input member and two differential output members;
   the drive output of the electrical machine being connected to the transmission input;
   the differential input member being connected to the transmission output, and the differential output members can be connected respectively to a left-hand and a right-hand driveshaft of the axle;
   the at least one transmission stage of the transmission device and the differential gear being arranged on opposite sides of the electric machine in the axial direction, with the differential gear being connected to the transmission stage by means of a hollow shaft;
   the at least one transmission stage of the transmission device and the differential gear are each located adjacent to and outside of the electrical machine
   wherein the hollow shaft extends at least from one axial end of the electrical machine to at least the other axial end of the electrical machine, and thereby runs through the entire rotor of the electrical machine.

31. Electric axle drive unit according to claim 30, wherein the transmission device has a single transmission stage.

32. Electric axle drive unit according to claim 30, wherein the differential gear has a planet-gear differential.

33. Electric axle drive unit according to claim 30, wherein the transmission device has at least two transmission stages.

34. Electric axle drive unit according to claim 33, wherein a first transmission stage is a spur gear stage arrangement with a countershaft which is arranged parallel to the axle.

35. Electric axle drive unit according to claim 34, wherein the first transmission stage is arranged on that side of the electric machine which is situated opposite the differential gear in the axial direction.

36. Electric axle drive unit according to claim 33, wherein a second transmission stage is arranged on the same side as the differential gear in the axial direction.

* * * * *